US012620099B2

(12) United States Patent
Bau et al.

(10) Patent No.: US 12,620,099 B2
(45) Date of Patent: May 5, 2026

(54) PICTURE QUALITY-SENSITIVE SEMANTIC SEGMENTATION FOR USE IN TRAINING IMAGE GENERATION ADVERSARIAL NETWORKS

(71) Applicant: Samsung Electronics Co., Ltd., Suwon-si (KR)

(72) Inventors: Tien C. Bau, Irvine, CA (US); Hrishikesh Deepak Garud, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 327 days.

(21) Appl. No.: 17/879,647

(22) Filed: Aug. 2, 2022

(65) Prior Publication Data

US 2023/0081128 A1 Mar. 16, 2023

Related U.S. Application Data

(60) Provisional application No. 63/244,988, filed on Sep. 16, 2021.

(51) Int. Cl.
| | |
|---|---|
| *G06T 7/11* | (2017.01) |
| *G06T 3/4046* | (2024.01) |
| *G06T 3/4053* | (2024.01) |

(52) U.S. Cl.
CPC ............. *G06T 7/11* (2017.01); *G06T 3/4046* (2013.01); *G06T 3/4053* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 10,825,219 B2 | 11/2020 | Fu et al. | |
| 2019/0130530 A1* | 5/2019 | Schroers | ............... G06T 3/4007 |

(Continued)

FOREIGN PATENT DOCUMENTS

| | | | | |
|---|---|---|---|---|
| CN | 110443805 A | * | 11/2019 | ............... G06N 3/08 |
| CN | 111310582 A | | 6/2020 | |

(Continued)

OTHER PUBLICATIONS

Y. Liu, H. Chen, Y. Chen, W. Yin and C. Shen, "Generic Perceptual Loss for Modeling Structured Output Dependencies," 2021 IEEE/CVF Conference on Computer Vision and Pattern Recognition (CVPR), Nashville, TN, USA, 2021, pp. 5420-5428, doi: 10.1109/CVPR46437.2021.00538.*

(Continued)

*Primary Examiner* — Jiangeng Sun

(57) ABSTRACT

A method includes training a semantic segmentation network to generate semantic segmentation maps having class-wise probability values. The method also includes generating a semantic segmentation map using the trained semantic segmentation network. The method further includes utilizing the semantic segmentation map during training of an image generation network as part of a loss function that includes multiple losses. The semantic segmentation network may be trained to be sensitive to picture quality of an output image generated by the image generation network during the training of the image generation network such that increased degradation of the picture quality of the output image results in decreased prediction confidence by the semantic segmentation network. The semantic segmentation network may be trained to vary the class-wise probability values based on the picture quality.

21 Claims, 9 Drawing Sheets

(56) References Cited

U.S. PATENT DOCUMENTS

| | | | |
|---|---|---|---|
| 2019/0295260 A1 | 9/2019 | Mehta et al. | |
| 2019/0355103 A1* | 11/2019 | Baek | G06T 5/60 |
| 2020/0005462 A1 | 1/2020 | Spizhevoy et al. | |
| 2020/0151497 A1 | 5/2020 | Kojima | |
| 2020/0356810 A1* | 11/2020 | Zhong | G06N 3/084 |
| 2020/0357096 A1* | 11/2020 | Gao | G06T 5/70 |
| 2021/0097297 A1* | 4/2021 | Ren | G06N 3/047 |
| 2021/0142116 A1 | 5/2021 | Jaipuria et al. | |
| 2021/0303925 A1 | 9/2021 | Hofmann et al. | |

FOREIGN PATENT DOCUMENTS

| | | |
|---|---|---|
| CN | 112102303 A | 12/2020 |
| CN | 113934890 A | 1/2022 |
| CN | 114199259 A | 3/2022 |
| KR | 10-2021-0040302 A | 4/2021 |

OTHER PUBLICATIONS

Ghafoorian et al., "EL-GAN: Embedding Loss Driven Generative Adversarial Networks for Lane Detection," European Conference on Computer Vision, Jul. 2018, 14 pages.
Wang et al., "Recovering Realistic Texture in Image Super-Resolution by Deep Spatial Feature Transform," IEEE/CVF Conference on Computer Vision and Pattern Recognition, Apr. 2018, 10 pages.
International Search Report and Written Opinion of the International Searching Authority dated Dec. 23, 2022 in connection with International Patent Application No. PCT/KR2022/013403, 8 pages.
Supplementary European Search Report dated Sep. 20, 2024 in connection with European Patent Application No. 22870201.5, 9 pages.
Yin, "Multi-Resolution Generative Adversarial Networks for Tiny-Scale Pedestrian Detection," 2019 IEEE International Conference on Image Processing (ICIP), Sep. 2019, 5 pages.
Niu e al., "Effective image restoration for semantic segmentation," Elsevier, Neurocomputing, Oct. 2019, 9 pages.
Chen et al., "Encoder-Decoder with Atrous Separable Convolution for Semantic Image Segmentation," European Conference on Computer Vision, Oct. 2018, 19 pages.
Pytorch Team, "DEEPLABVB-RESNET101: DeepLabV3 model with a ResNet-101 backbone," Jul. 2021, 5 pages.
Rad et al., "Benefiting from Multitask Learning to Improve Single Image Super-Resolution," Neurocomputing (Special Issue on Deep Learning for Image Super-Resolution), Jul. 2019, 23 pages.
Kampffmeyer et al., "Semantic Segmentation of Small Objects and Modeling of Uncertainty in Urban Remote Sensing Images Using Deep Convolutional Neural Networks", IEEE Conference on Computer Vision and Pattern Recognition Workshops (CVPRW), Jun. 2016, 9 pages.

* cited by examiner

PICTURE QUALITY-SENSITIVE SEMANTIC SEGMENTATION FOR USE IN TRAINING IMAGE GENERATION ADVERSARIAL NETWORKS

CROSS-REFERENCE TO RELATED APPLICATION AND PRIORITY CLAIM

This application claims priority under 35 U.S.C. § 119(e) to U.S. Provisional Patent Application No. 63/244,988 filed on Sep. 16, 2021, which is hereby incorporated by reference in its entirety.

TECHNICAL FIELD

This disclosure relates generally to imaging systems. More specifically, this disclosure relates to a system and method for picture quality-sensitive semantic segmentation for use in training image generation adversarial networks.

BACKGROUND

Image generation algorithms typically create new images from scratch by learning abstract contextual information of real-life objects, such as cars, trees, mountains, clouds, and the like. Image generation algorithms are useful or important for multiple applications like training data generation, super-resolution, simulation, and the like. Typically, machine learning models are trained using special methods and loss functions to achieve desired results. For example, generative adversarial network (GAN)-based super-resolution algorithms often try to generate the most realistic high-resolution images with the aid of perceptual loss and discriminator loss. Most of these algorithms generate details that are plausible but not realistic, meaning one can easily tell they are artificially generated on close inspection.

SUMMARY

This disclosure provides a system and method for picture quality-sensitive semantic segmentation for use in training image generation adversarial networks.

In a first embodiment, a method includes training a semantic segmentation network to generate semantic segmentation maps having class-wise probability values. The method also includes generating a semantic segmentation map using the trained semantic segmentation network. The method further includes utilizing the semantic segmentation map during training of an image generation network as part of a loss function that includes multiple losses.

In a second embodiment, an electronic device includes at least one memory configured to store instructions. The electronic device also includes at least one processing device configured when executing the instructions to train a semantic segmentation network to generate semantic segmentation maps having class-wise probability values. The at least one processing device is also configured when executing the instructions to generate a semantic segmentation map using the trained semantic segmentation network. The at least one processing device is further configured when executing the instructions to utilize the semantic segmentation map during training of an image generation network as part of a loss function that includes multiple losses.

In a third embodiment, a non-transitory machine-readable medium contains instructions that when executed cause at least one processor of an electronic device to train a semantic segmentation network to generate semantic segmentation maps having class-wise probability values. The medium also contains instructions that when executed cause the at least one processor to generate a semantic segmentation map using the trained semantic segmentation network. The medium further contains instructions that when executed cause the at least one processor to utilize the semantic segmentation map during training of an image generation network as part of a loss function that includes multiple losses.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
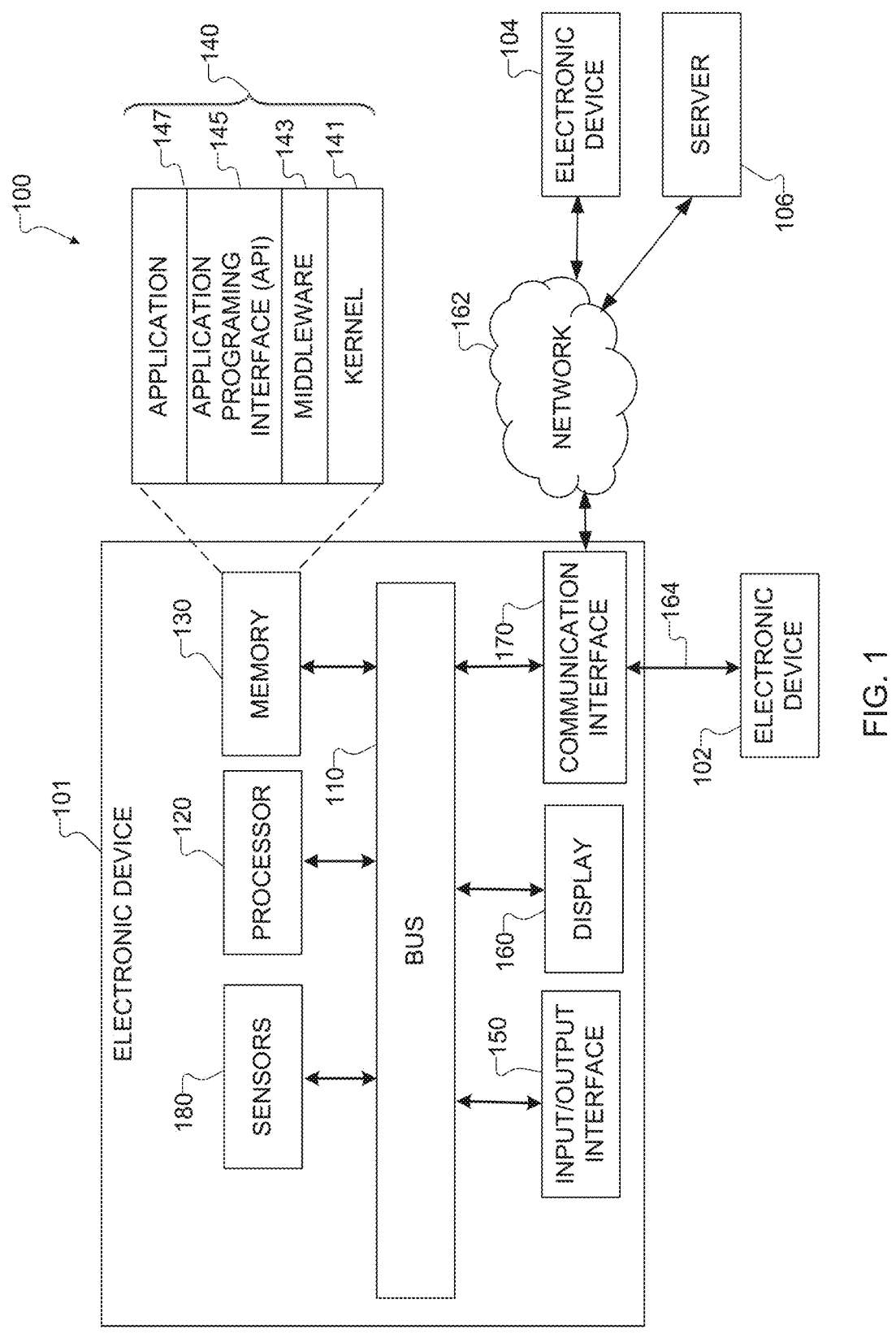
FIG. 1 illustrates an example network configuration including an electronic device according to this disclosure.

FIGS. 1 through 9, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, image generation algorithms typically create new images from scratch by learning abstract contextual information of real-life objects, such as cars, trees, mountains, clouds, and the like Image generation algorithms are useful or important for multiple applications like training data generation, super-resolution, simulation, and the like. Typically, machine learning models are trained using special methods and loss functions to achieve desired results. For example, generative adversarial network (GAN)-based super-resolution algorithms often try to generate the most realistic high-resolution images with the aid of perceptual loss and discriminator loss. Most of these algorithms generate details that are plausible but not realistic, meaning one can easily tell they are artificially generated on close inspection.

There have been various attempts at improving the quality of generated images using multi-task learning and prior information. One technique called spatial feature transform generative adversarial network (SFT-GAN) uses a semantic segmentation map that is computed by another network and provided as prior knowledge to a super-resolution network. Using one or more workarounds, the textures of different objects in generated images can appear more natural and realistic. However, such techniques often come at substantial increases in hardware deployment and latency costs. For example, the overall SFT-GAN system includes two networks with a total of more than fifty million parameters, where the largest contribution comes from the semantic segmentation network. For a real-world system with resource and timing constraints (such as a consumer-facing product like a television), a smaller alternative that can achieve good picture quality is desired.

This disclosure provides systems and methods for picture quality-sensitive semantic segmentation that can be used in training image generation adversarial networks. As described in more detail below, the disclosed systems and methods train a semantic segmentation network and generate one or more semantic segmentation maps using the trained semantic segmentation network. Each semantic segmentation map can be used during training of an image generation network as part of a loss function that includes multiple losses, including a semantic segmentation loss provided by the semantic segmentation network. The trained image generation network may then be provided to one or more user devices for use.

Compared to prior techniques, the disclosed embodiments can improve the realism of generated images with no increase in hardware costs. This makes these embodiments ideal for real-world applications such as embedded or edge artificial intelligence (AI) applications, image quality enhancement applications, super-resolution applications, High Dynamic Range 10+ (HDR10+) applications, text recognition applications, face segmentation applications, or other applications. Note that while some of the embodiments discussed below are described in the context of use in consumer electronic devices (such as televisions), this is merely one example, and it will be understood that the principles of this disclosure may be implemented in any number of other suitable contexts.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described in more detail below, the processor 120 may perform one or more operations for picture quality-sensitive semantic segmentation for use in training image generation adversarial networks.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions for picture quality-sensitive semantic segmentation for use in training image generation adversarial networks as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations to support techniques for picture quality-sensitive semantic segmentation for use in training image generation adversarial networks.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
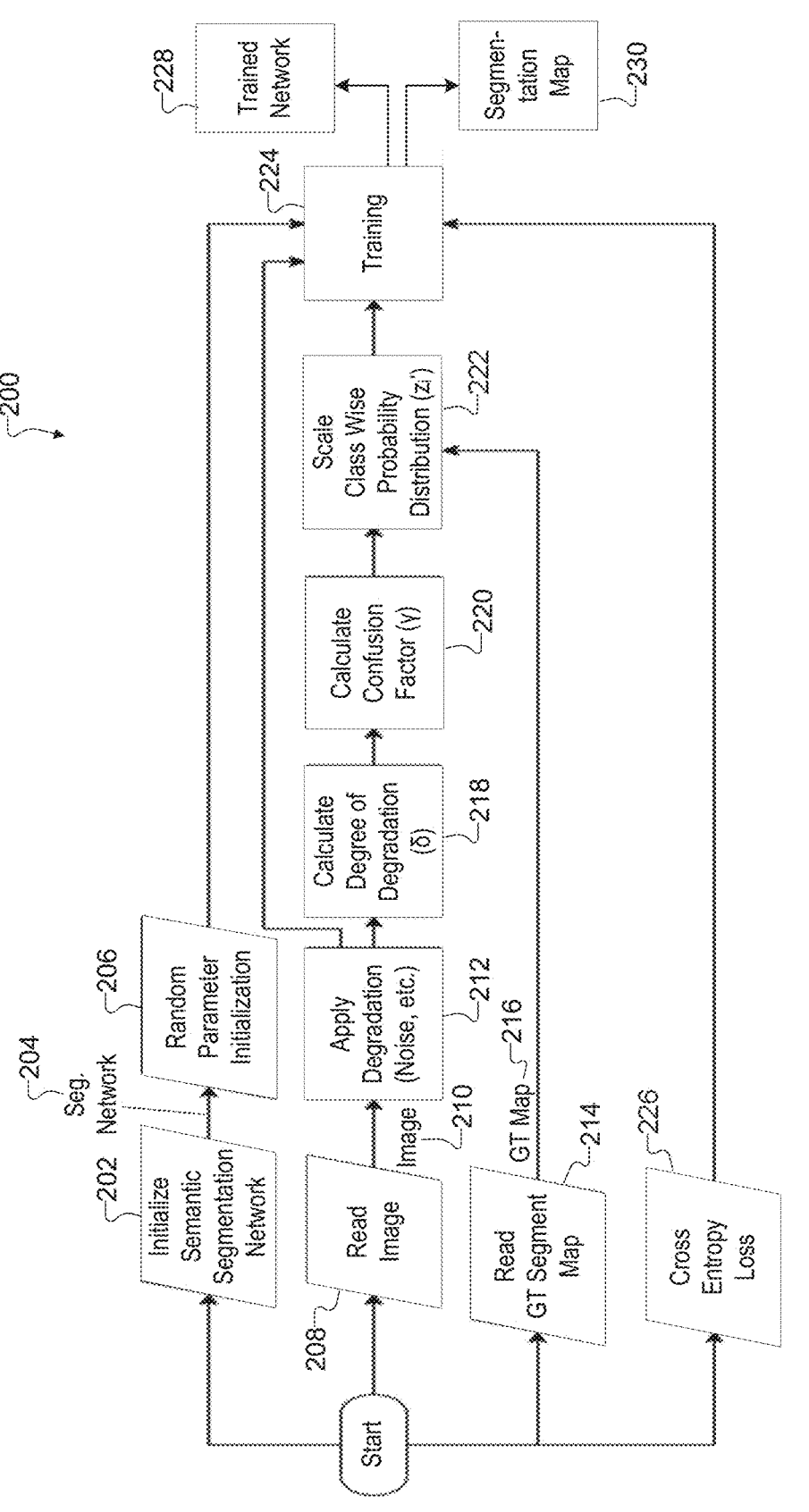
FIG. 2 illustrates an example process for training a semantic segmentation network to be sensitive to picture quality according to this disclosure.

FIG. 2 illustrates an example process 200 for training a semantic segmentation network to be sensitive to picture quality according to this disclosure. For ease of explanation, the process 200 is described as being implemented using one or more components of the server 106 described above. However, this is merely one example, and the process 200 could be implemented using any other suitable device(s).

As previously described, a value of a segmentation loss can change according to its input picture quality. Typically, semantic segmentation networks are trained to be robust to noise and any kind of visual artifacts like ringing and patterning. This is typically achieved by augmenting a training dataset with noise and compression along with adding more real-world examples. In contrast, the process 200 can be used to train a semantic segmentation network to be sensitive to these or other perturbations because of the semantic segmentation network's role in an image generation pipeline. More specifically, after training using the process 200, when the semantic segmentation network receives clean high-quality images, the network can predict the correct class label for each pixel with a high confidence score, such as when the output probability for the correct class label is a maximum and close to a softmax score of 1.0. Conversely, the trained network's confidence will decrease when an input image is degraded, such as when a class-wise distribution is smoother and not concentrated on any one class label. In some embodiments, the process 200 can be implemented such that the trained network predicts the "background" class more than the correct class label.

As shown in FIG. 2, at operation 202, the server 106 obtains and initializes a semantic segmentation network 204. The semantic segmentation network 204 can represent an untrained semantic segmentation network or a trained semantic segmentation network that needs to be retrained. The semantic segmentation network 204 may be initially generated in any suitable manner and have any suitable machine learning-based structure, such as a convolution neural network, deep learning network, or other architecture. If trained, the semantic segmentation network 204 may also be trained in any suitable manner using any suitable training data. At operation 206, the server 106 performs random parameter initialization on the semantic segmentation network 204, which generally involves randomly assigning values to parameters of the semantic segmentation network 204. Various approaches may be used to randomly assign values to parameters of the semantic segmentation network 204, such as when the parameter values are randomly assigned from a standard normal distribution or a uniform distribution of values.

At operation 208, the server 106 samples an input image 210 for segmentation. The input image 210 represents any suitable input image and may include a simulated image or an image captured using an imaging sensor. At operation 212, the server 106 applies one or more degradation techniques to the image 210, such as randomly adding Gaussian blur and/or compression of differing amounts. Essentially, the server 106 here is artificially creating degradation in the image 210, where the type(s) and amount(s) of degradation can be controlled. At operation 214, the server 106 samples a ground truth segmentation map 216 that corresponds to the image 210. The ground truth segmentation map 216 represents a segmentation map that is known to correspond to the image 210. For example, the ground truth segmentation map 216 may identify the correct class label for each pixel of the image 210, where each class label identifies an object or other classification of image data. Example types of classifications may include objects such as people, cars, trees, mountains, or clouds. The ground truth segmentation map 216 therefore identifies the correct classifications of the various pixels in the image 210, which can be used to train the semantic segmentation network 204.

To train the network 204, a confusion factor $\gamma$ is introduced, which has an inverse relationship with picture quality. As a result, the class-wise probability values output from the semantic segmentation network 204 have higher confusion when the output picture quality is lower. Here, a class-wise probability value refers to a vector of values indicating probabilities that a pixel of the image 210 belongs to each of a set of classifications (such as people, cars, trees, mountains, or clouds). This behavior helps to ensure the proper generation of correct and full details in an object during downstream image processing. In the process 200, the confusion factor $\gamma$ is a function of a degree of degradation $\delta$ of the image 210. Thus, the degree of degradation $\delta$ can be determined, and the confusion factor $\gamma$ can be determined based on the degree of degradation $\delta$. At operation 218, the server 106 calculates the degree of degradation $\delta$ of the image 210. In some embodiments, the following expression may be used to calculate the degree of degradation $\delta$ of the image 210:

$$\delta = (\sigma + \rho)/2$$

Here, $\sigma$ represents the standard deviation of a Gaussian or other blur kernel, and $\rho$ represents a Joint Photographic Experts Group (JPEG) compression quality factor or other compression factor. The blur kernel and compression factor can represent the degradations applied to the image 210 during the operation 212. The server 106 calculates the confusion factor $\gamma$ at operation 220. In some embodiments, the following expression may be used to calculate the confusion factor $\gamma$:

$$\gamma = \phi \ln\left(\delta + \exp\left(\frac{\epsilon}{\phi}\right)\right)$$

Here, $\epsilon$ and $\phi$ represent predetermined smoothing parameters, which in some embodiments may be obtained or determined empirically. In particular embodiments, the predetermined smoothing parameters are constants.

At operation 222, the server 106 scales the class-wise probability distribution of the image 210. In other words, the server 106 adjusts the distributions of the class labels (such as by adjusting each probability value to a higher or lower probability) for the pixels of the image 210, which can be performed based on the determined confusion factor $\gamma$.

Depending on how much noise or other degradation is present in the image 210, the confidence for each pixel can be scaled using the confusion factor $\gamma$ by plugging the confusion factor $\gamma$ into a class-wise distribution equation. In some embodiments, the scaling can be performed using the following class-wise distribution equation:

$$z'_i = \frac{\exp\frac{z_i}{\gamma}}{\sum_j \exp\frac{z_i}{\gamma}}$$

Here, $z_i$ represents the class probability value for each class i, and $z'_i$ represents the scaled probability for each class i. Also, j represents the total number of classes represented in the image 210.

At operation 224, the server 106 trains the semantic segmentation network 204 using the image 210. During the training, the class-wise probability distribution of the image 210 can inform the semantic segmentation network 204 that the semantic segmentation network 204 should predict a "background" class for each image pixel if the amount of noise associated with that image pixel is high. In other words, the semantic segmentation network 204 can be trained to predict the background class more often when picture quality is lower. As a result, the class-wise probability output precision of the semantic segmentation network 204 varies with picture quality. During the operation 224, a cross entropy loss 226 or other loss values may be calculated and used during the training. In some embodiments, one or more of the loss values may be determined based on differences between (i) one or more semantic segmentation maps generated by the semantic segmentation network 204 being trained and (ii) the ground truth segmentation map 216. The output of the operation 224 is a trained semantic segmentation network 228 and one or more semantic segmentation maps 230.

As described in greater detail below, the trained semantic segmentation network 228 and the semantic segmentation map(s) 230 can be used in the training of an image generation network. The trained semantic segmentation network 228 is sensitive to the picture quality of output images generated by the image generation network during the training. As a result, output images with increased degradation in picture quality can result in decreased prediction confidence by the trained semantic segmentation network 228.

Although FIG. 2 illustrates one example of a process 200 for training a semantic segmentation network to be sensitive to picture quality, various changes may be made to FIG. 2. For example, while shown as a specific sequence of operations, various operations shown in FIG. 2 could overlap, occur in parallel, occur in a different order, or occur any number of times (including zero times). Also, the specific operations shown in FIG. 2 are examples only, and other techniques could be used to perform each of the operations shown in FIG. 2.

Figures 3A, 3B, 3C, 3D:
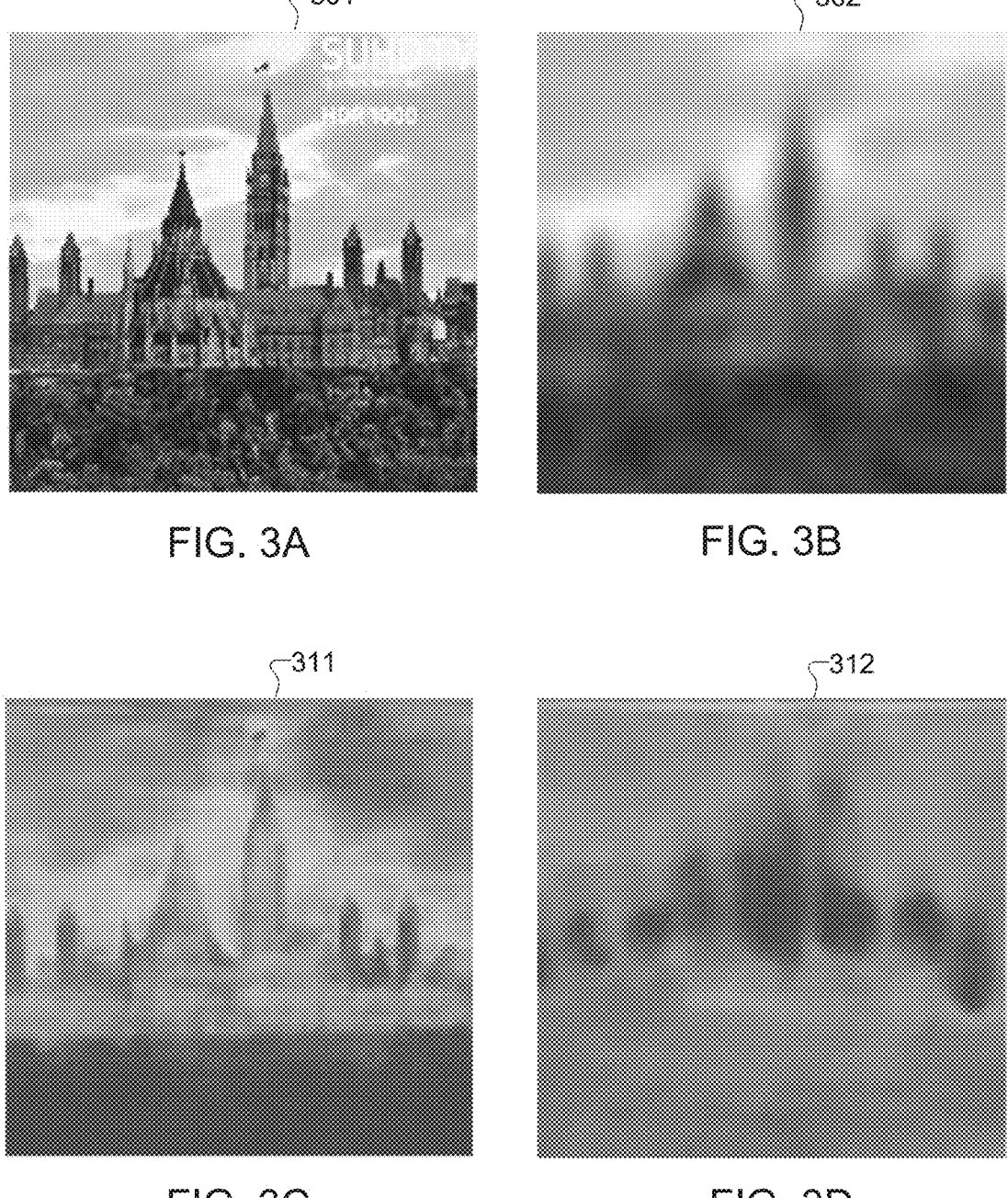
FIGS. 3A through 3D illustrate how degradation of an image can affect a generated semantic segmentation map during the process of FIG. 2 according to this disclosure.

FIGS. 3A through 3D illustrate how degradation of an image 210 can affect a generated semantic segmentation map 230 during the process 200 according to this disclosure. More specifically, FIGS. 3A and 3B illustrate two different images 301 and 302, each of which can represent an image 210 during the process 200. As shown in FIGS. 3A and 3B, the images 301 and 302 are of the same scene, but the image 301 is much sharper (has less blur) than the image 302. For instance, a smaller or no Gaussian blur or other blur may be applied to produce the image 301, while a much larger Gaussian blur or other blur may be applied to produce the image 302.

FIGS. 3C and 3D illustrate two semantic segmentation maps 311 and 312 that correspond to the images 301 and 302, respectively. The semantic segmentation maps 311 and 312 can represent two instances of semantic segmentation maps 230 generated by the process 200 using the images 301 and 302 as inputs. As shown in FIG. 3C, the semantic segmentation map 311 includes regions that are closely correlated to features of the clearer image 301, including clouds, a clock tower, and trees below a building. In contrast, as shown in FIG. 3D, the semantic segmentation map 312 reflects much lower prediction confidence due to the larger blurring of the image 302. At higher blur levels, the trained semantic segmentation network 228 tends to mistake image patches for incorrect types of classifications, such as a water class (since smoother areas of the blurred image 302 resemble a water surface) or a background class.

Although FIGS. 3A through 3D illustrate examples of how degradation of an image 210 can affect a generated semantic segmentation map 230 during the process 200, various changes may be made to FIGS. 3A through 3D. For example, the images being used during the process 200 and the semantic segmentation maps produced by the process 200 can vary widely based on the circumstances. While the images 301 and 302 and the semantic segmentation maps 311 and 312 shown in FIGS. 3A through 3D are representative of results obtained using the process 200, other results could be achieved.

FIGS. 4 through 7 illustrate different examples of training frameworks for training an image generation network using a semantic segmentation network according to this disclosure. For ease of explanation, each of the training frameworks is described as being implemented using one or more components of the server 106 described above. However, this is merely one example, and each of the training frameworks could be implemented using any other suitable device(s).

Figure 4:
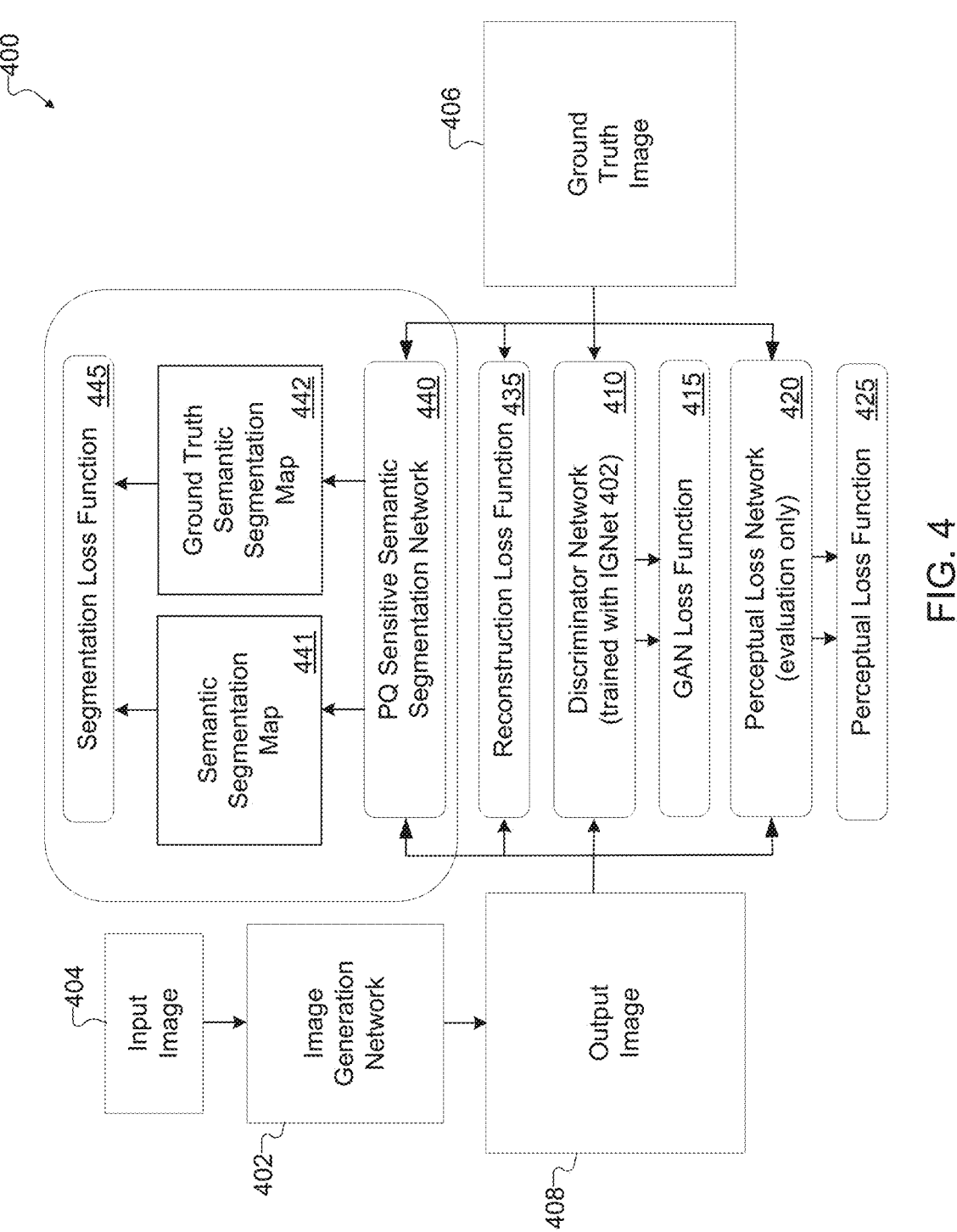
FIGS. 4 through 7 illustrate different examples of training frameworks for training an image generation network using a semantic segmentation network according to this disclosure.

As shown in FIG. 4, a training framework 400 is implemented for training an image generation network 402. The image generation network 402 generally represents a machine learning model that is trained to produce images. The image generation network 402 may have any suitable machine learning-based structure, such as a convolution neural network or other architecture. The image generation network 402 can also be trained to perform any suitable type of image generation function. In some embodiments, the image generation network 402 represents a super-resolution network, which represents a machine learning model that is trained to take input images and generate output images having improved resolutions. In other embodiments, the image generation network 402 represents an image simulation network, which represents a machine learning model that is trained to produce simulated images having desired characteristics or contents. Note, however, that the image generation network 402 may represent any other suitable image generation network.

During training of the image generation network 402, the training framework 400 uses at least one input image 404 and at least one corresponding ground truth image 406, and the image generation network 402 is used to generate at least one output image 408. Each input image 404 represents an image to be processed by the image generation network 402 in order to produce a corresponding output image 408. Each ground truth image 406 represents the desired results to be produced by the image generation network 402 using the corresponding input image 404. In other words, each ground truth image 406 represents the ideal output image 408 to be produced by the image generation network 402. In reality, each output image 408 generally differs from the corresponding ground truth image 406 in some way. Typically, there are much larger differences between the output images 408 and the ground truth images 406 initially during the training, and the identified differences are used to adjust parameters of the image generation network 402. As a result, the differences between the output images 408 and the ground truth images 406 become fewer and smaller over time as the image generation network 402 is adjusted during the training. The input image(s) 404 and the ground truth image(s) 406 may be obtained from any suitable source(s), such as a third-party open-source repository or other source.

In this example, the image generation network 402 is trained adversarially using multiple neural networks or other machine learning models. In this particular example, the image generation network 402 is trained adversarially using a discriminator network 410 and a perceptual loss network 420. The discriminator network 410 may generally be designed to discriminate between real data and generated data. The discriminator network 410 calculates one type of loss, such as a generative adversarial network (GAN) loss or other type of discriminator loss 415. Here, a discriminator loss refers to a loss function that reflects the distance between a distribution of data generated by a neural network (such as the image generation network 402 in this example) and a distribution of real data. The perceptual loss network 420 may generally be designed to cause the image generation network 402 to generate output images 408 that have the same or similar features as the ground truth images 406. The perceptual loss network 420 calculates another type of loss, such as a perceptual loss 425. Here, a perceptual loss indicates a difference between two different images that look similar, like two instances of the same image frame where, for instance, one is shifted by one pixel relative to the other. The perceptual loss 425 can reflect high level differences, such as content and style discrepancies, between images.

In some embodiments, the discriminator network 410 is trained along with the training of the image generation network 402 in the training framework 400, which may allow the discriminator network 410 to become more effective at tricking the image generation network 402 (which itself can help to train the image generation network 402 more effectively). Also, in some embodiments, the perceptual loss network 420 may be pre-trained on an image classification task and may remain frozen throughout the training performed by the training framework 400. However, other embodiments of the discriminator network 410 and the perceptual loss network 420 may be used. In some cases, the image generation network 402 may further be trained using a reconstruction loss 435, which may represent absolute or other differences between the output image(s) 408 and the associated ground truth image(s) 406. The reconstruction loss 435 can be expressed in any suitable manner, such as a Euclidean norm or Manhattan distance between real and generated images.

In addition to the discriminator network 410 and the perceptual loss network 420, the training framework 400 uses a semantic segmentation network 440, which may represent the trained semantic segmentation network 228 discussed above. The semantic segmentation network 440 is used to calculate a segmentation loss 445, which identifies differences between how the semantic segmentation network 440 segments output images 408 produced by the image generation network 402 and how the semantic segmentation network 440 segments ground truth images 406. The segmentation loss 445 can be used as another loss term, along with the discriminator loss 415, perceptual loss 425, and reconstruction loss 435, to help train the image generation network 402.

In this example, the semantic segmentation network 440 generates the segmentation loss 445 based on a comparison between at least one semantic segmentation map 441 and at least one ground truth semantic segmentation map 442. Each semantic segmentation map 441 corresponds to an output image 408, and each ground truth semantic segmentation map 442 corresponds to a ground truth image 406. Each semantic segmentation map 441 may represent a class-wise semantic segmentation map, which means that the semantic segmentation map 441 may identify the class (person, car, tree, mountain, cloud, etc.) for each pixel of the corresponding output image 408. In some cases, each semantic segmentation map 441 may represent an instance of the semantic segmentation map 230. Similarly, each ground truth semantic segmentation map 442 may represent a class-wise semantic segmentation map, which means that the ground truth semantic segmentation map 442 may identify the class (person, car, tree, mountain, cloud, etc.) for each pixel of the corresponding ground truth image 406. Each ground truth semantic segmentation map 442 represents the correct segmentation of the corresponding ground truth image 406, while each semantic segmentation map 441 typically has one or more differences with its associated ground truth semantic segmentation map 442 since the corresponding output image 408 does not exactly match its ground truth image 406. In some embodiments, the semantic segmentation network 440 may be used only during the training process and is not deployed to end user devices (such as televisions or mobile devices) so as to avoid the associated hardware costs. Instead, the trained image generation network 402 may be deployed without the semantic segmentation network 440.

In the training framework 400, the semantic segmentation network 440 may be pre-trained to be sensitive to the picture quality of the input image(s) 404 as described above. For example, the semantic segmentation network 440 can be trained using the process 200 of FIG. 2. If an input image 404 contains a lot of degradation, the performance of the semantic segmentation network 440 may also degrade. For instance, an output class distribution of the semantic segmentation network 440 (which defines the probabilities that each pixel of the input image 404 is associated with different classes) may be less confident of the correct class when the input image 404 contains more noise or compression. Conversely, given a clean input image 404, the semantic segmentation network 440 can be much more confident in predicting the output class distribution for the pixels.

Figure 5:
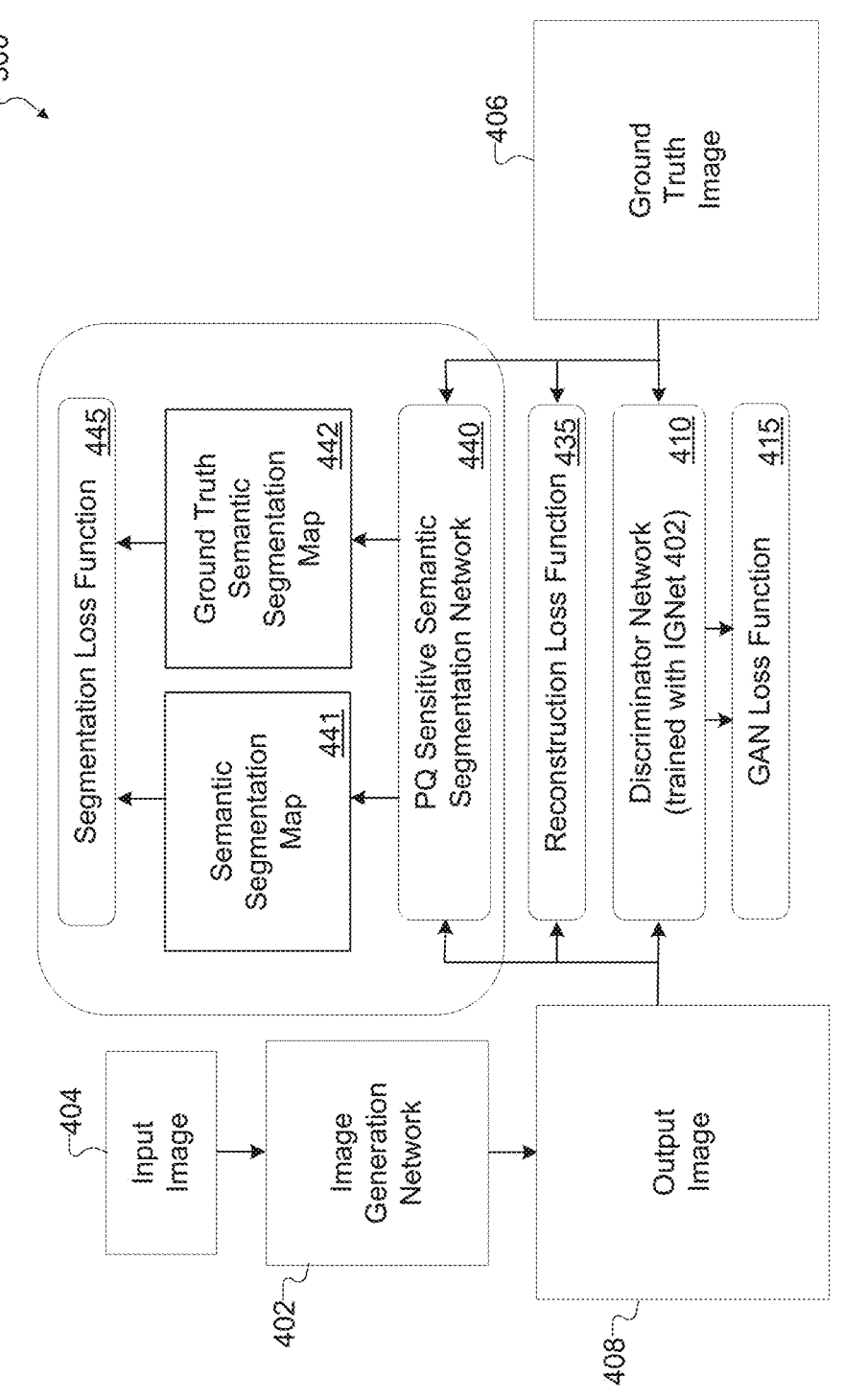

As shown in FIG. 5, a training framework 500 includes a number of components that are the same as or similar to corresponding components of the training framework 400 of FIG. 4. Here, the training framework 500 is implemented for training an image generation network 402 and uses at least one input image 404 and at least one corresponding ground truth image 406, and the image generation network 402 is used to generate at least one output image 408. As in the training framework 400, the image generation network 402 in the training framework 500 is trained adversarially using a discriminator network 410. The training framework 500 also uses a reconstruction loss 435. However, in contrast to the training framework 400, the training framework 500 does not include a perceptual loss network.

The training framework 500 also uses a semantic segmentation network 440, which generates a segmentation loss 445. The semantic segmentation network 440 may be used in the same or similar manner as described above. As in the training framework 400, in some embodiments, the semantic segmentation network 440 may be used only in the training process and may not be deployed to end user devices. Instead, the trained image generation network 402 may be deployed to end user devices without the semantic segmentation network 440. Because the training framework 500 does not include a perceptual loss network, the semantic segmentation network 440 may replace the perceptual loss neural network in providing perceptual quality information for use during training.

Figure 6:
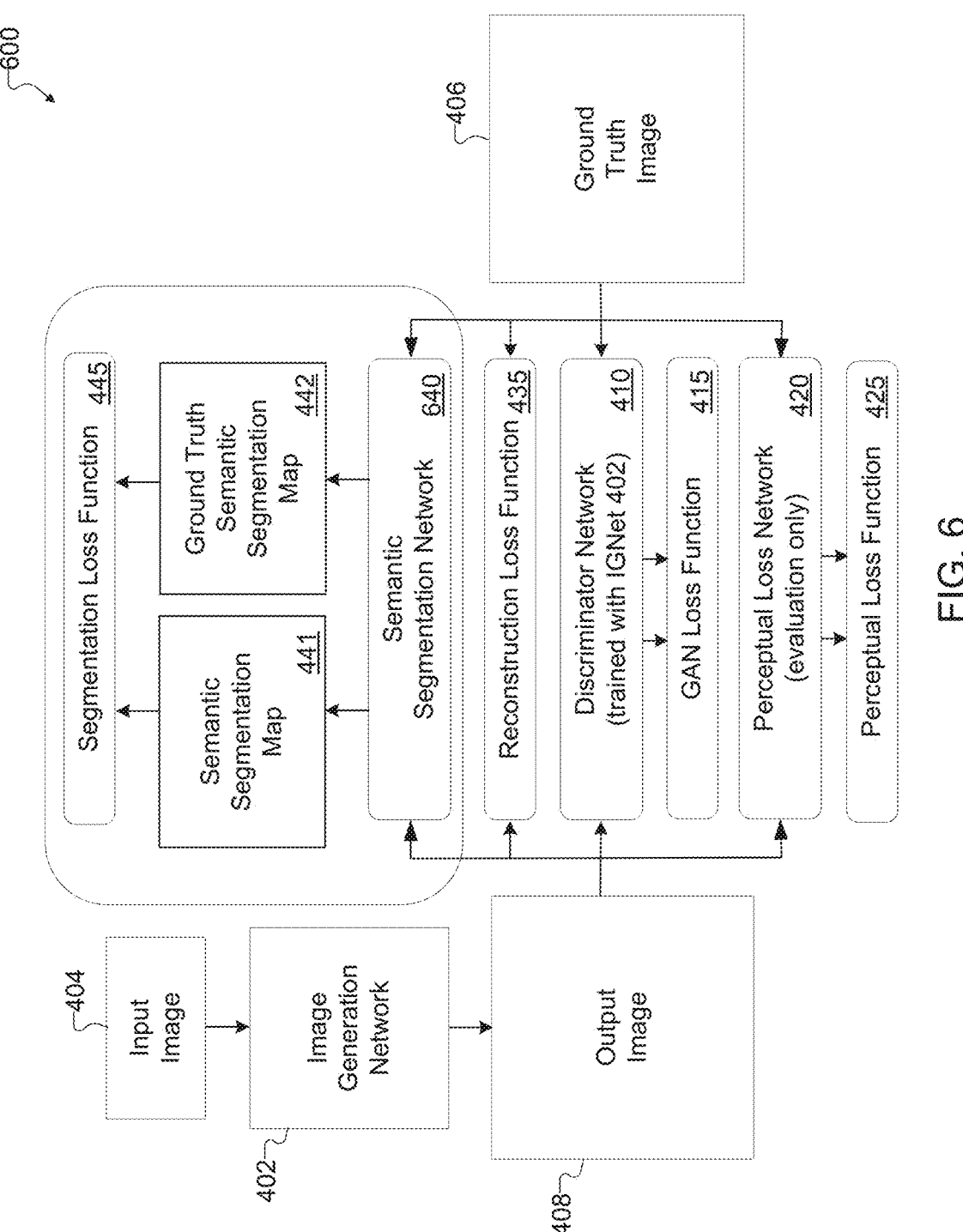

As shown in FIG. 6, a training framework 600 includes a number of components that are the same as or similar to corresponding components of the training framework 400 of FIG. 4. Here, the training framework 600 is implemented for training an image generation network 402 and uses at least one input image 404 and at least one corresponding ground truth image 406, and the image generation network 402 is used to generate at least one output image 408. As in the training framework 400, the image generation network 402 in the training framework 600 is trained adversarially using a discriminator network 410 and a perceptual loss network 420. The training framework 600 also uses a reconstruction loss 435.

The training framework 600 also uses a semantic segmentation network 640, which generates a segmentation loss 445. As in the training framework 400, in some embodiments, the semantic segmentation network 640 may be used only in the training process and may not be deployed to end user devices. Instead, the trained image generation network 402 may be deployed to end user devices without the semantic segmentation network 640. In this example, in contrast to the semantic segmentation network 440 of FIGS. 4 and 5, the semantic segmentation network 640 has not been pre-trained to be sensitive to the picture quality of the input image(s) 404. For example, the pre-training of the semantic segmentation network 640 may not include the operations 212, 218, 220, and 222 shown in FIG. 2. As a result, the semantic segmentation network 640 may not be sensitive to the picture quality of the output image(s) 408 generated by the image generation network 402 during the training of the image generation network 402. While this may mean that increased degradation of the picture quality of the output image(s) 408 does not result in decreased prediction confidence by the semantic segmentation network 640, this approach can still be useful in training the image generation network 402.

Figure 7:
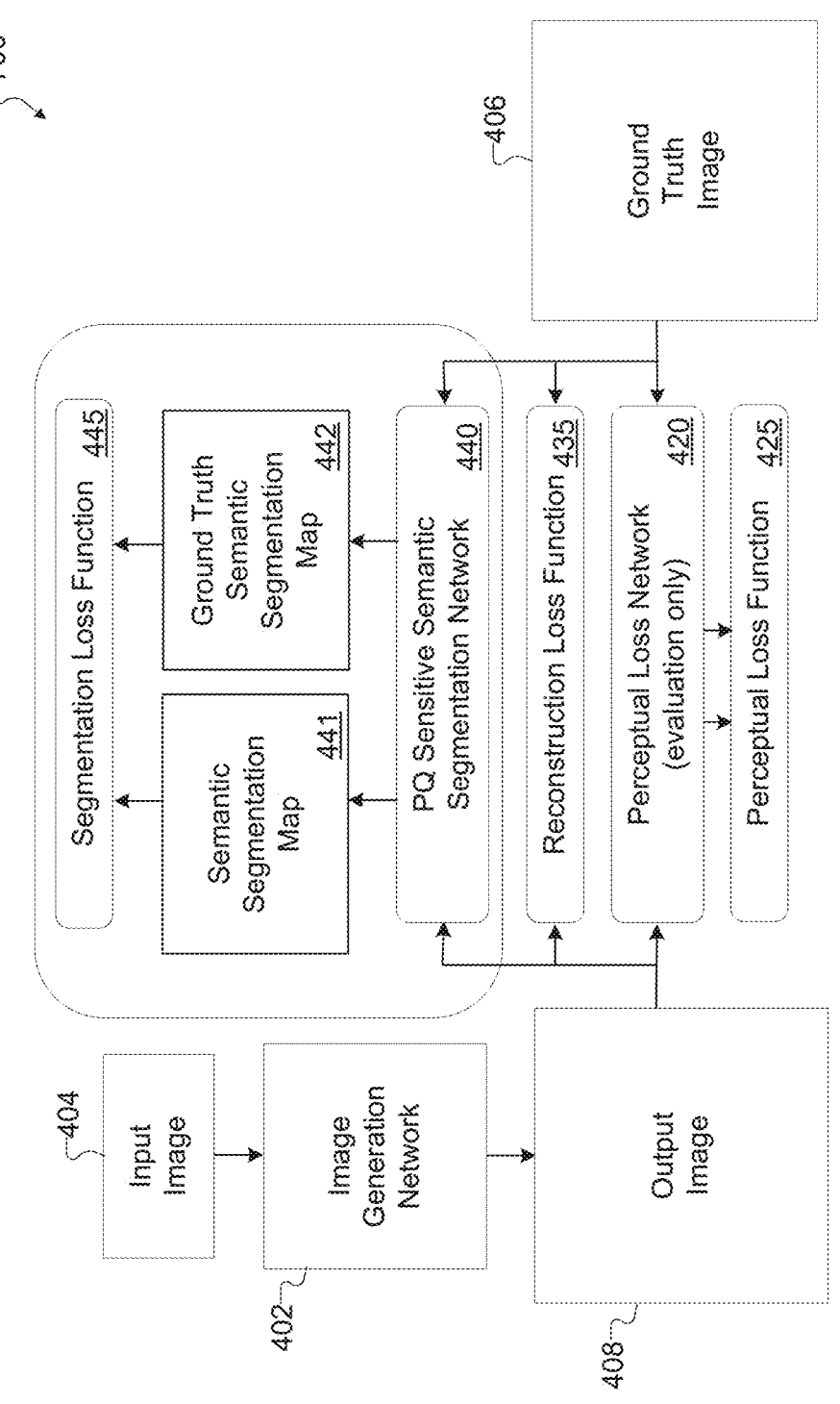

As shown in FIG. 7, a training framework 700 includes a number of components that are the same as or similar to corresponding components of the training framework 400 of FIG. 4. Here, the training framework 700 is implemented for training an image generation network 402 and uses at least one input image 404 and at least one corresponding ground truth image 406, and the image generation network 402 is used to generate at least one output image 408. As in the training framework 400, the image generation network 402 in the training framework 700 is trained adversarially using a perceptual loss network 420. The training framework 700 also uses a reconstruction loss 435. However, in contrast to the training framework 400, the training framework 700 does not include a discriminator network.

The training framework 700 also uses a semantic segmentation network 440, which generates a segmentation loss 445. The semantic segmentation network 440 may be used in the same or similar manner as described above. As in the training framework 400, in some embodiments, the semantic segmentation network 440 may be used only in the training process and may not be deployed to end user devices. Instead, the trained image generation network 402 may be deployed to end user devices without the semantic segmentation network 440. Because the training framework 700 does not include a discriminator network, the semantic segmentation network 440 may replace the discriminator network in providing semantic object information, as well as providing a base distribution of real objects in real images.

Although FIGS. 4 through 7 illustrate examples of training frameworks for training an image generation network using a semantic segmentation network, various changes may be made to FIGS. 4 through 7. For example, while the training frameworks in FIGS. 4 through 7 are described with various examples of machine learning models and tasks, other embodiments could include other machine learning models and/or other tasks. Also, in some embodiments of the training frameworks 500 and 700, the semantic segmentation network 440 could be replaced with the semantic segmentation network 640.

Note that the operations and functions shown in FIGS. 2 and 4 through 7 can be implemented in an electronic device 101, server 106, or other device in any suitable manner. For example, in some embodiments, the operations and functions shown in FIGS. 2 and 4 through 7 can be implemented or supported using one or more software applications or other software instructions that are executed by the processor 120 of the electronic device 101, server 106, or other device. In other embodiments, at least some of the operations and functions shown in FIGS. 2 and 4 through 7 can be implemented or supported using dedicated hardware components. In general, the operations and functions shown in FIGS. 2 and 4 through 7 can be performed using any suitable hardware or any suitable combination of hardware and software/firmware instructions.

Figure 8C:
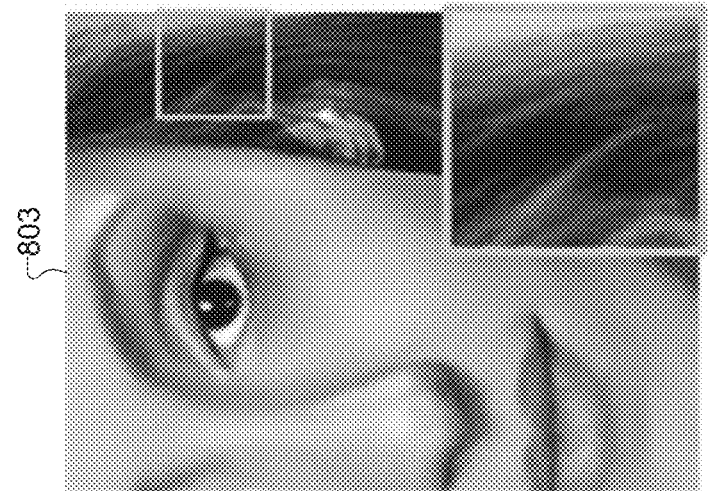
FIGS. 8A through 8C illustrate examples of benefits that can be realized using one or more embodiments of this disclosure.
Figure 8B:
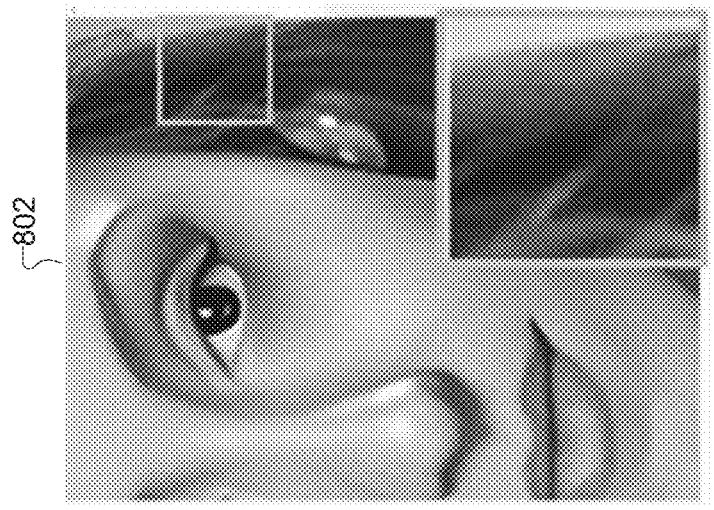
Figure 8A:
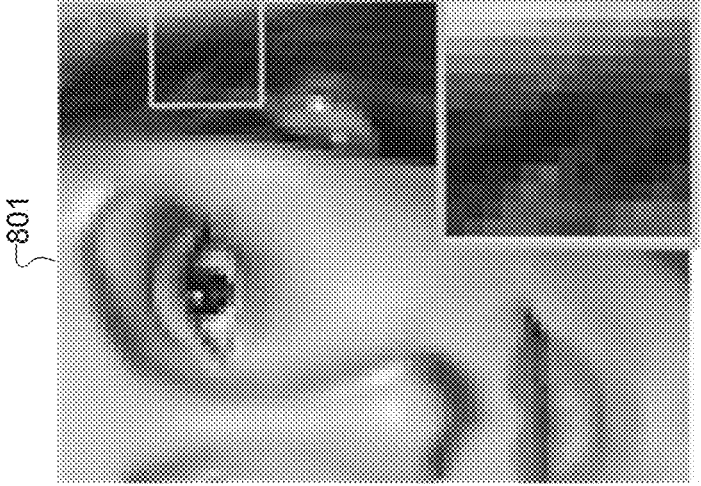

FIGS. 8A through 8C illustrate examples of benefits that can be realized using one or more embodiments of this disclosure. In FIG. 8A, a lower-resolution image 801 is shown, which may represent a simulated image or an image captured using one or more imaging sensors of a consumer electronic device. In FIG. 8B, the image 801 has been enhanced using a super-resolution technique without consideration of semantic segmentation loss, thereby generating an image 802. In FIG. 8C, the image 801 has been enhanced using a super-resolution technique with consideration of semantic segmentation loss as disclosed above (such as is described in FIGS. 4 through 7), thereby generating an image 803. As evident by FIGS. 8B and 8C, the image 803 is more realistic than the image 802 and exhibits higher perceptual quality overall.

Although FIGS. 8A through 8C illustrate examples of benefits that can be realized using one or more embodiments of this disclosure, various changes may be made to FIGS. 8A through 8C. For example, images can be captured of numerous scenes under different lighting conditions and from different distances and angles, and these figures do not limit the scope of this disclosure. These figures are merely meant to illustrate one example of the types of benefits that might be obtainable using the techniques described above.

Figure 9:
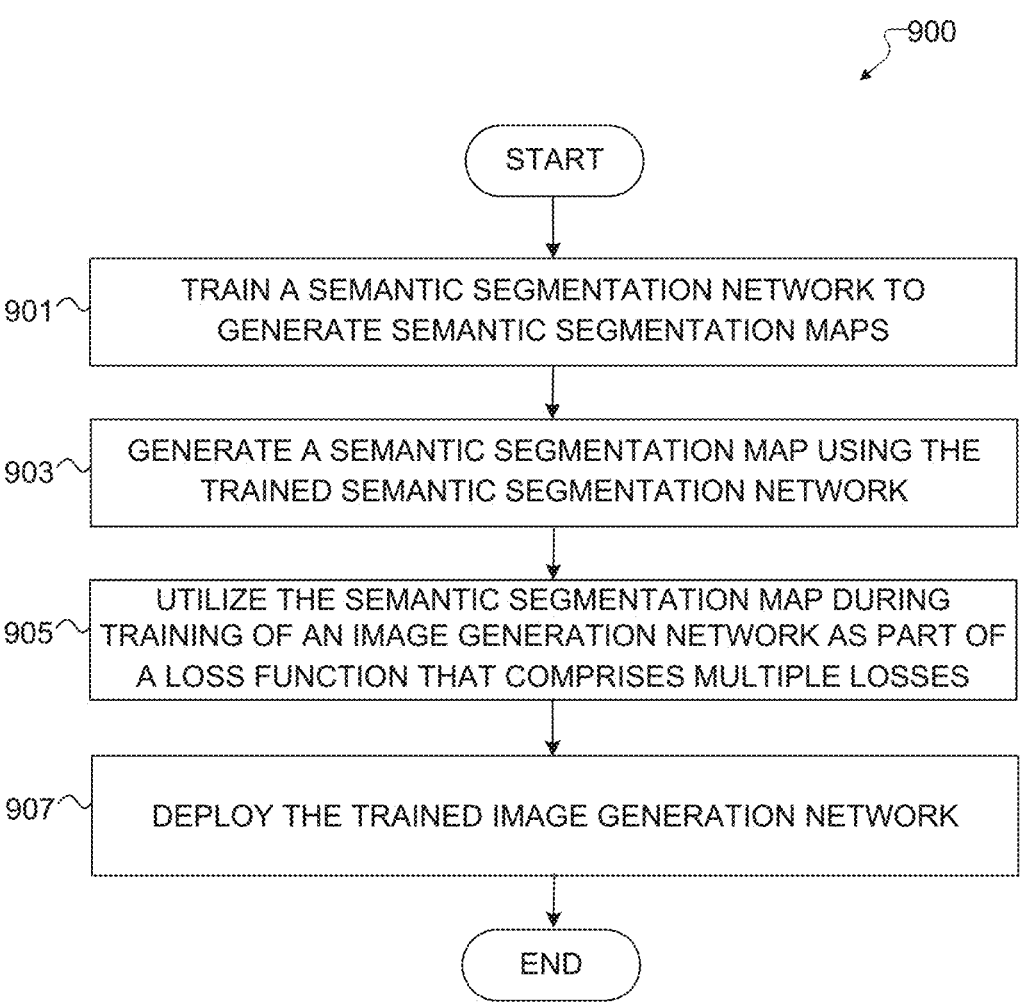
FIG. 9 illustrates an example method for picture quality-sensitive semantic segmentation according to this disclosure.

FIG. 9 illustrates an example method 900 for picture quality-sensitive semantic segmentation according to this disclosure. For ease of explanation, the method 900 shown in FIG. 9 is described as involving the use of the server 106 shown in FIG. 1, the training process 200 shown in FIG. 2, and one or more of the training frameworks 400, 500, 600, and 700 shown in FIGS. 4 through 7. However, the method 900 shown in FIG. 9 could be used with any other suitable electronic device and any suitable process or framework.

As shown in FIG. 9, a semantic segmentation network is trained to generate semantic segmentation maps having class-wise probability values at step 901. This could include, for example, the server 106 performing the training process 200 to train the semantic segmentation network 204 to generate semantic segmentation maps having class-wise probability values. The class-wise probability values identify the probabilities that pixels or other portions of images contain content of different classifications (such as people, cars, trees, mountains, clouds, and the like). In some embodiments, the semantic segmentation network is trained to be sensitive to the picture quality of images, which allows the semantic segmentation network to be sensitive to the picture quality of output image to be generated by an image generation network during training of the image generation network. As a result, increased degradation of the picture quality of an image can result in decreased prediction confidence by the semantic segmentation network. Also, in some embodiments, the semantic segmentation network is trained to vary the class-wise probability values based on the picture quality. In some cases, this can include scaling each class-wise probability value using a confusion factor $\gamma$, which may have an inverse relationship with the picture quality such that each class-wise probability value indicates higher confusion when the picture quality is lower.

A semantic segmentation map is generated using the trained semantic segmentation network at step 903. This could include, for example, the server 106 using the trained semantic segmentation network 228 to generate one or more semantic segmentation maps 230. The semantic segmentation map is utilized during training of an image generation network as part of a loss function that includes multiple losses at step 905. This could include, for example, the server 106 using any of the training frameworks 400, 500, 600, 700 and the one or more semantic segmentation maps during training of an image generation network 402. In some cases, the image generation network 402 can represent a super-resolution machine learning model or an image simulation machine learning model, although any other suitable image generation network may be used here. The semantic segmentation map(s) can be used as part of a loss function that includes multiple losses, such as when a semantic segmentation loss 445 is used along with one or more of a discriminator loss 415, a perceptual loss 425, or a reconstruction loss 435.

Once trained, the trained image generation network is deployed to one or more devices at step 907. This could include, for example, the server 106 sending the trained image generation network 402 to one or more end user devices (such as televisions or mobile devices, which may be represented by the electronic device 101 in some cases). In some embodiments, the semantic segmentation network 440 may not be deployed to the end user devices with the trained image generation network 402.

Although FIG. 9 illustrates one example of a method 900 for picture quality-sensitive semantic segmentation, various changes may be made to FIG. 9. For example, while shown as a series of steps, various steps in FIG. 9 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

training a semantic segmentation network to generate semantic segmentation maps comprising class-wise probability values;

generating a semantic segmentation map using the trained semantic segmentation network; and utilizing the semantic segmentation map during training of an image generation network as part of a loss function that comprises multiple losses;

wherein training the semantic segmentation network comprises training the semantic segmentation network to be sensitive to picture quality of an output image generated by the image generation network during the training of the image generation network such that increased degradation of the picture quality of the output image results in decreased prediction confidence by the semantic segmentation network;

wherein training the semantic segmentation network to be sensitive to picture quality comprises training the semantic segmentation network to vary the class-wise probability values based on the picture quality; and wherein training the semantic segmentation network to vary the class-wise probability values based on the picture quality comprises scaling each class-wise probability value using a confusion factor having an inverse relationship with the picture quality such that each class-wise probability value indicates higher confusion when the picture quality is lower.

2. The method of claim 1, further comprising:

deploying the trained image generation network without the semantic segmentation network.

3. The method of claim 1, wherein the multiple losses of the loss function comprise a perceptual loss provided by the semantic segmentation network during the training of the image generation network.

4. The method of claim 1, wherein the multiple losses of the loss function comprise a reconstruction loss.

5. The method of claim 1, further comprising:

determining the confusion factor based on a degree of degradation of the output image generated by the image generation network.

6. The method of claim 1, wherein the multiple losses of the loss function comprise a semantic segmentation loss provided by the semantic segmentation network, a pixel loss, and a generative adversarial network (GAN) loss provided by a discriminator network.

7. The method of claim 6, wherein the loss function further comprises a perceptual loss provided by a pre-trained perceptual neural network.

8. The method of claim 1, wherein the image generation network comprises a super-resolution neural network or an image simulation network.

9. An electronic device comprising:

at least one memory configured to store instructions; and at least one processing device configured when executing the instructions to:

train a semantic segmentation network to generate semantic segmentation maps comprising class-wise probability values;

generate a semantic segmentation map using the trained semantic segmentation network; and train an image generation network based on the semantic segmentation map as part of a loss function that comprises multiple losses;

wherein the at least one processing device is configured to train the semantic segmentation network to be sensitive to picture quality of an output image generated by the image generation network during the training of the image generation network based on a confusion factor, the confusion factor having an inverse relationship with the picture quality;

wherein, to train the semantic segmentation network to be sensitive to picture quality, the at least one processing device is configured to train the semantic segmentation network to vary the class-wise probability values based on the picture quality; and wherein, to train the semantic segmentation network to vary the class-wise probability values based on the picture quality, the at least one processing device is configured to scale each class-wise probability value using the confusion factor having the inverse relationship with the picture quality such that each class-wise probability value indicates higher confusion when the picture quality is lower.

10. The electronic device of claim 9, wherein increased degradation of the picture quality of the output image results in decreased prediction confidence by the semantic segmentation network.

11. The electronic device of claim 9, wherein the multiple losses of the loss function comprise a perceptual loss provided by the semantic segmentation network during the training of the image generation network.

12. The electronic device of claim 9, wherein the multiple losses of the loss function comprise a reconstruction loss.

13. The electronic device of claim 9, wherein the multiple losses of the loss function comprise a semantic segmentation loss provided by the semantic segmentation network, a pixel loss, and a generative adversarial network (GAN) loss provided by a discriminator network.

14. The electronic device of claim 13, wherein the loss function further comprises a perceptual loss provided by a pre-trained perceptual neural network.

15. The electronic device of claim 9, wherein the image generation network comprises a super-resolution neural network or an image simulation network.

16. A non-transitory machine-readable medium containing instructions that when executed cause at least one processor of an electronic device to:

train a semantic segmentation network to generate semantic segmentation maps comprising class-wise probability values;

generate a semantic segmentation map using the trained semantic segmentation network; and train an image generation network based on the semantic segmentation map as part of a loss function that comprises multiple losses;

wherein the instructions that when executed cause the at least one processor to train the semantic segmentation network comprise instructions that when executed cause the at least one processor to train the semantic segmentation network to be sensitive to picture quality of an output image generated by the image generation network during the training of the image generation network based on a confusion factor, the confusion factor having an inverse relationship with the picture quality;

wherein the instructions that when executed cause the at least one processor to train the semantic segmentation network to be sensitive to picture quality comprise instructions that when executed cause the at least one processor to train the semantic segmentation network to vary the class-wise probability values based on the picture quality; and wherein the instructions that when executed cause the at least one processor to train the semantic segmentation network to vary the class-wise probability values based on the picture quality comprise instructions that when executed cause the at least one processor to scale each class-wise probability value using the confusion factor having the inverse relationship with the picture quality such that each class-wise probability value indicates higher confusion when the picture quality is lower.

17. The non-transitory machine-readable medium of claim 16, wherein increased degradation of the picture quality of the output image results in decreased prediction confidence by the semantic segmentation network.

18. The non-transitory machine-readable medium of claim 16, wherein the multiple losses of the loss function comprise a perceptual loss provided by the semantic segmentation network during the training of the image generation network.

19. The non-transitory machine-readable medium of claim 16, wherein the multiple losses of the loss function comprise a reconstruction loss.

20. The non-transitory machine-readable medium of claim 16, wherein the multiple losses of the loss function comprise a semantic segmentation loss provided by the semantic segmentation network, a pixel loss, and a generative adversarial network (GAN) loss provided by a discriminator network.

21. The non-transitory machine-readable medium of claim 20, wherein the loss function further comprises a perceptual loss provided by a pre-trained perceptual neural network.

* * * * *